(12) United States Patent
Imamura et al.

(10) Patent No.: US 8,952,633 B2
(45) Date of Patent: Feb. 10, 2015

(54) HIGH PRESSURE DISCHARGE LAMP LIGHTING APPARATUS

(75) Inventors: Atsushi Imamura, Hyogo (JP); Takanori Samejima, Hyogo (JP); Minoru Fukuda, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/236,463

(22) PCT Filed: Jul. 10, 2012

(86) PCT No.: PCT/JP2012/067557
§ 371 (c)(1),
(2), (4) Date: Jan. 31, 2014

(87) PCT Pub. No.: WO2013/018513
PCT Pub. Date: Feb. 7, 2013

(65) Prior Publication Data
US 2014/0167641 A1    Jun. 19, 2014

(30) Foreign Application Priority Data

Aug. 1, 2011 (JP) ................. 2011-168238

(51) Int. Cl.
| H05B 37/02 | (2006.01) |
| H05B 41/24 | (2006.01) |
| H05B 41/288 | (2006.01) |
| H05B 41/292 | (2006.01) |

(52) U.S. Cl.
CPC ............ *H05B 41/24* (2013.01); *H05B 41/2887* (2013.01); *H05B 41/2928* (2013.01); *Y02B 20/208* (2013.01); *Y02B 20/202* (2013.01)
USPC ........... 315/360; 315/307; 315/291; 315/289; 315/224

(58) Field of Classification Search
CPC .... H05B 41/3928; H05B 37/02; Y02B 20/20; Y02B 20/204; G03B 21/005
USPC ............. 315/209 R, 224, 247, 244, 246, 287, 315/289, 291, 307, 360, 237, 326; 353/85
See application file for complete search history.

(56) References Cited

U.S. PATENT DOCUMENTS

| 8,294,390 B2 * | 10/2012 | Samejima et al. ............ 315/326 |
| 2011/0210680 A1 | 9/2011 | Yamamoto et al. |
| 2011/0310361 A1 * | 12/2011 | Brueckel et al. ................. 353/85 |
| 2012/0313546 A1 * | 12/2012 | Imamura et al. ............... 315/287 |

FOREIGN PATENT DOCUMENTS

| JP | 2006-332015 A | 12/2006 |
| JP | 2007-087637 A | 4/2007 |
| JP | 2007-273439 A | 10/2007 |
| WO | WO-2010/035368 A1 | 4/2010 |

OTHER PUBLICATIONS

International Search Report issued in Application No. PCT/JP2012/067557, dated Sep. 4, 2012.

* cited by examiner

*Primary Examiner* — Haiss Philogene
(74) *Attorney, Agent, or Firm* — Rader, Fishman & Grauer PLLC

(57) ABSTRACT

In a lighting apparatus containing a high pressure discharge lamp, an alternating current supplied to the discharge lamp at the time of steady lighting of the frequency (basic frequency) selected from a range between 60 and 1000 Hz and a low frequency having a frequency selected from a range between 5 and 200 Hz lower than the basic frequency is generated alternately. The frequency of the low frequency wave is changed in response to the change of the lighting voltage of the discharge lamp. The supply period of the basic frequency is increased and decreased little by little by every predetermined time.

2 Claims, 10 Drawing Sheets

FIG.4
(a) WHEN VOLTAGE IS LOW (FOR EXAMPLE 70V)
(b) WHEN VOLTAGE IS HIGH (FOR EXAMPLE 90V)
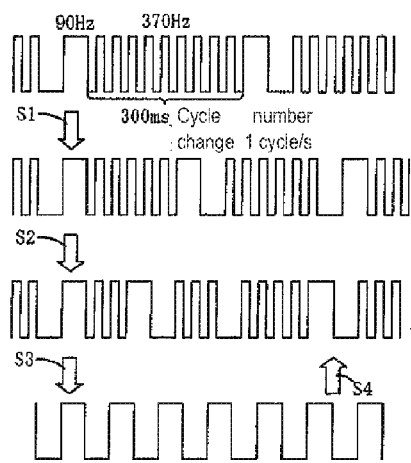
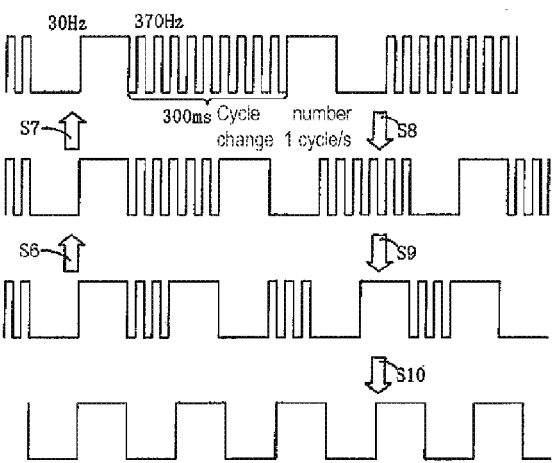

FIG.9
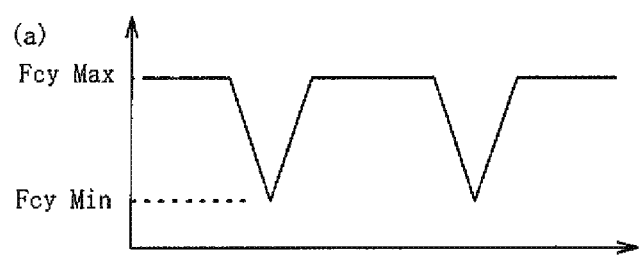
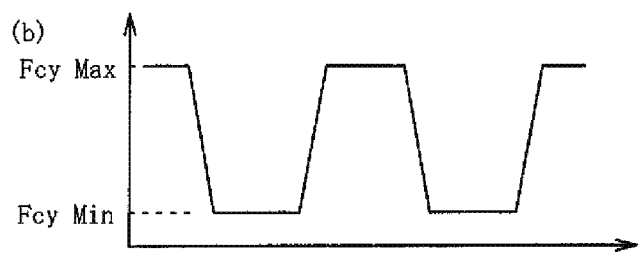
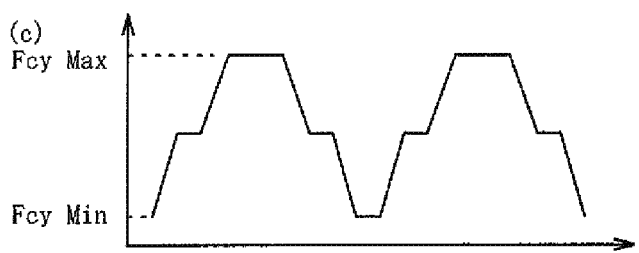

FIG.10
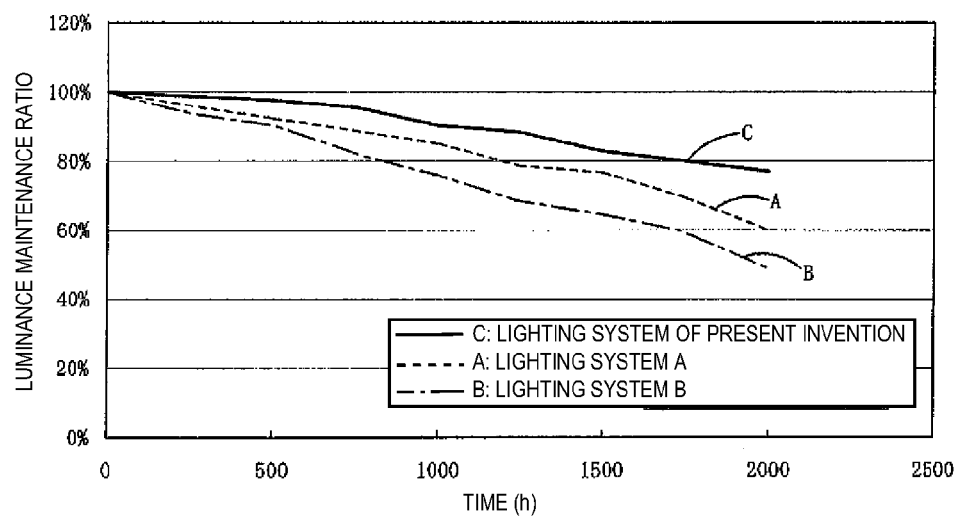
FIG.11                PRIOR ART
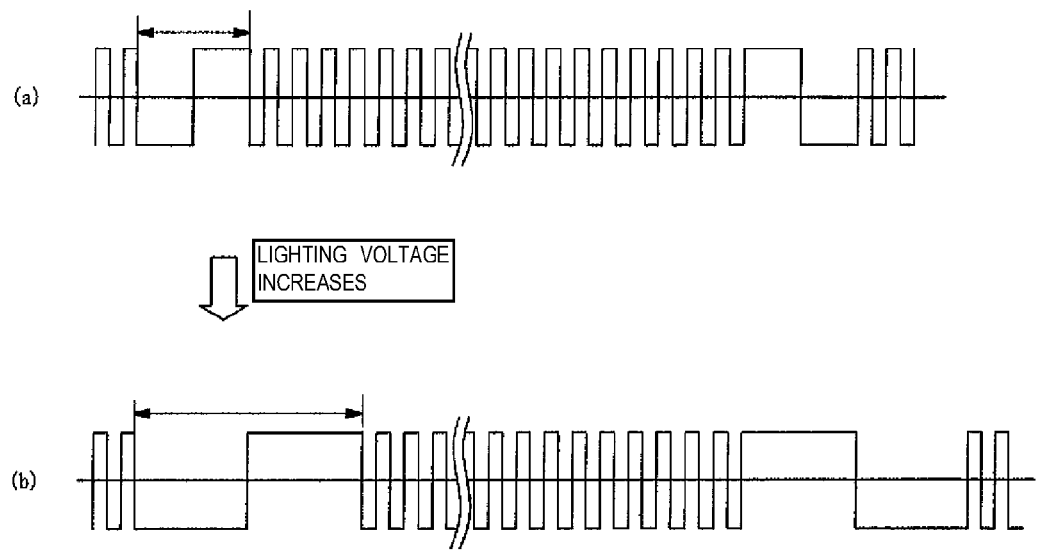

HIGH PRESSURE DISCHARGE LAMP LIGHTING APPARATUS

TECHNICAL FIELD

The present invention relates to a high pressure discharge lamp lighting apparatus including a super-high pressure discharge lamp and a power supply apparatus therefor preferably used in a light source for projectors or the like.

BACKGROUND ART

A super-high pressure discharge lamp in which at least 0.2 mg/mm$^3$ mercury is enclosed in an interior of a discharge container and configured to increase in pressure to 200 atmospheric pressure or higher at the time of lighting is used for a lamp for a light source for projectors or the like. The high pressure discharge lamp as described above is known to maintain a stable lighting state by forming a projection on a distal end surface of an electrode and retaining an arc on the projection while the lamp is lighting.

In contrast, when the high pressure discharge lamp is continuously lit for a longtime in the same state, a plurality of projections may be formed or projections and depressions may be generated on the distal end surface of the electrode. It is known that when the surface portion of the distal end of the electrode is roughened, a discharging position becomes unstable, and lowering of luminance or flickering may occur due to a displacement of the arc.

In order to solve the problem described above, Patent Literature 1 describes a system of lighting a discharge lamp including supplying a frequency selected from a range between 60 and 1000 Hz to a high pressure discharge lamp as a steady frequency, and inserting a low frequency selected in frequency from a range between 5 and 200 Hz, in number of units from 1 unit to 10 units, where one unit corresponds to the number of waves to be inserted, and in intervals of insertion from a range between 0.01 seconds and 120 seconds intermittently (cyclically) into an alternating current having the steady frequency while changing parameters of the low frequency to be selected in accordance with a change of the lighting voltage of the discharge lamp.

FIG. 11 illustrates a system of lighting a discharge lamp described in Patent Literature 1 described above.

In the same figure, the drawing (a) in the same figure illustrates a case where the lamp voltage is low, and the drawing (b) in the same figure illustrates a case where the lamp voltage is high. As illustrated in the drawing (a) in the same figure, when the lamp voltage is low, an alternating current having a frequency selected from a frequency range between 60 and 1000 Hz is supplied as an alternating current having a frequency which is basic at the time of steady lighting (basic frequency), and a frequency, which is a frequency lower than the basic frequency and selected from a range between 5 and 200 Hz is supplied at a predetermined interval. When the lamp voltage is increased, a width of the frequency lower than the basic frequency to be supplied at the predetermined interval is increased as illustrated in the drawing (b) in the same figure. Accordingly, the temperature of the projection can be maintained always at an optimal state.

In other words, according to this technology, a stable arc discharge can be formed by forming a projection at a distal end of the electrode and using the projection as an original point and, even when the lighting voltage of the lamp is changed, only the projection which is to be the original point of the arc can be generated and maintained and, simultaneously, needless projections other than the corresponding projection can be eliminated, so that elongation of the lifetime of the electrode is achieved.

CITATION LIST

Patent Literature

PTL 1: JP-A-2006-332015

SUMMARY OF INVENTION

Technical Problem

According to the lighting system descried in Patent Literature 1 described above, even when the lighting voltage of the lamp is changed, only the projection which is to be the original point of the arc can be generated and maintained and, simultaneously, needless projections other than the corresponding projection can be eliminated.

However, even when lighting the lamp in the above-described lighting system, the lamp is lit by inserting a constant frequency lower than the basic frequency at the time of steady lighting intermittently at a predetermined interval during a period in which the lamp voltage is not changed.

FIG. 12 illustrates a state of electrodes in the case where the frequency lower than the basic frequency is inserted into the basic frequency at the time of the steady lighting. FIG. 12(a) illustrates a lighting current waveform and the drawings (b-1), (b-2), (c-1), and (c-2) in the same figure illustrate states of the electrodes.

At the time of an anode cycle, the temperature of the projection is increased to supply tungsten into a gas phase. Subsequently, when the polarity is reversed and becomes a cathode cycle, the temperature of the projection is abruptly lowered.

It is considered that a portion near a root of the projection is lowered to a temperature at which tungsten from the gas phase is solidified at this time, and as illustrated in FIG. 12(b-1), a large amount of tungsten from the gas phase is accumulated near the root of the projection. Also, since the time width is large, a large amount of ionized tungsten in the arc can be attracted and hence a larger amount of accumulation is resulted.

The tungsten accumulated by a large amount near the root of the projection is fused in an anode cycle caused by the next low frequency, and becomes part of the projection. However, at that time, as illustrated in FIG. 12(b-2), when the accumulated tungsten is melted and taken as part of the projection, the projection may be displaced. In other words, it is considered that excessive accumulation of the tungsten supplied in the anode cycle of the low frequency in the cathode cycle coming immediately after causes the displacement of the projection, and such minute displacement is repeated to cause the projection to be displaced.

It was found that even when the lighting system described in Patent Literature 1 described above was used, the phenomenon as described above was generated if the state in which the lamp voltage did not change continued for a certain period or longer, whereby the projection of the electrode was displaced.

In other words, as a result of diligent study of the present inventor, it was found that the above-described positional displacement was occurred in a state in which the lamp voltage was not changed, for example, for 10 minutes or more while the lamp was lighting and the low frequency did not change during that period, and the timing at which the low frequency was inserted into the basic frequency did not change.

The electrode repeats an action such that the projection is fused and evaporated upon reception of heat caused by arc discharge as described above, and the evaporated substance is accumulated again as a projection, and it is supposed that when the period in which the basic frequency is supplied is constant, the position on the electrode near the root of the projection to which a significant amount of the evaporated tungsten is solidified and adhered is fixed to some extent, so that in a state in which the low frequency does not change, accumulation is generated at position other than the distal end of the electrode under the influence of heat convection in a light-emitting tube.

When the projection is displaced as described above, and hence a state changes from the illustrated in FIG. 12(c-1) to that illustrated in FIG. 12(c-2), the distance between the electrodes is increased, the lighting voltage is increased, so that the luminance is lowered due to the change of the position of the arc.

Furthermore, since the lighting voltage is increased, the width of the inserted low frequency is increased as illustrated in FIG. 11. In this manner, when the low frequency is lowered, the projection is heated and hence the amount of evaporation is increased and blackening occurs on an inner wall of the light-emitting tube. When such an action is repeated many times, a luminance maintenance ratio is lowered with time.

In order to solve the above-described problem, it is an object of the present invention to provide a high pressure discharge lamp lighting apparatus configured to light a lamp by inserting a low frequency lower than a basic frequency at the time of steady lighting at intermittently a predetermined interval and changes the frequency of the low-frequency wave described above in accordance with a change of the lighting voltage, wherein lowering of the luminance maintenance ratio due to a positional displacement of a projection is suppressed and elongation of lifetime of a discharge lamp is achieved.

Solution to Problem

As described in Patent Literature 1 described above, according to the present invention, in the high pressure discharge lamp lighting apparatus configured to light a lamp by inserting a low frequency lower than a basic frequency at the time of steady lighting at intermittently a predetermined interval and change the frequency of the low-frequency wave described above in accordance with a change of the lighting voltage, the period in which the basic frequency is supplied is increased and decreased little by little at every predetermined period.

In this manner, by increasing and decreasing the period in which the basic frequency is supplied little by little and changing the interval of insertion of the low frequency in addition to changing of the frequency of the low-frequency wave described above in accordance with the change of the lighting voltage, the positional displacement of the projection is suppressed, whereby the advantages described in Patent Literature 1 described above are also achieved.

Accordingly, in the present invention, the above-described problem is solved in the following manner. (1) A high pressure discharge lamp lighting apparatus including: a high pressure discharge lamp including a pair of electrodes arranged so as to oppose each other in the interior of a discharge container formed of quartz glass and mercury enclosed therein, and a power supply apparatus configured to supply an alternating current to the discharge lamp, characterized in that the power supply apparatus is configured to supply an alternating current having a basic frequency including a frequency at the time of steady lighting and an alternating current having a low frequency lower than the basic frequency alternately to the high pressure discharge lamp, the alternating current having the basic frequency is an alternating current having a frequency selected from a range between 60 and 1000 Hz, the alternating current having the low frequency is an alternating current having a frequency selected from a range between 5 and 200 Hz lower than the frequency of the alternating current of the basic frequency, and having a length of half a cycle or longer, has an interval from generation of the low-frequency alternating current to generation of the next low-frequency alternating current 120 seconds or shorter, and changes the frequency of the low-frequency wave in response to the change of the lighting voltage of the discharge lamp, and the power supply apparatus supplies an alternating current to the high pressure discharge lamp so as to increase and decrease a period in which the basic frequency is supplied little by little by every predetermined time at least during a period in which the lighting voltage of the discharge lamp continues at the same lighting voltage. (2) In (1) described above, the power supply apparatus changes the frequency of the low-frequency wave to a low frequency when the lighting voltage of the discharge lamp is increased, and to a high frequency when the lighting voltage of the discharge lamp is lowered.

Advantageous Effects of the Invention

In the present invention, in addition to the configuration of the high pressure discharge lamp lighting apparatus configured to light a lamp by inserting a low frequency lower than a basic frequency at the time of steady lighting at intermittently a predetermined interval and change the frequency of the low-frequency wave described above in accordance with a change of the lighting voltage, the period in which the basic frequency is supplied is increased and decreased little by little at every predetermined period, so that the displacement of the projection is suppressed. Therefore, lowering of the luminous maintenance ratio is suppressed, and occurrence of blackening on the inner wall of the light-emitting tube may be suppressed. In addition, in the same manner as described in Patent Literature 1, even when the lighting voltage of the lamp is changed, only the projection which is to be the original point of the arc can be generated and maintained and, simultaneously, needless projections other than the corresponding projection can be eliminated, so that elongation of the lifetime of the electrode is enabled.

BRIEF DESCRIPTION OF THE DRAWINGS

FIG. 4 is a drawing illustrating an example of a transition of a waveform of the present invention.

FIG. 9 is a drawing illustrating another example of a change pattern of the set value to be used for a current waveform control of the present invention.

FIG. 10 is a drawing illustrating a result of a comparative experiment conducted for confirming advantages of the present invention.

FIG. 11 is a drawing illustrating an example of a discharge lamp lighting system of the related art.

DESCRIPTION OF EMBODIMENTS

Figure 1:
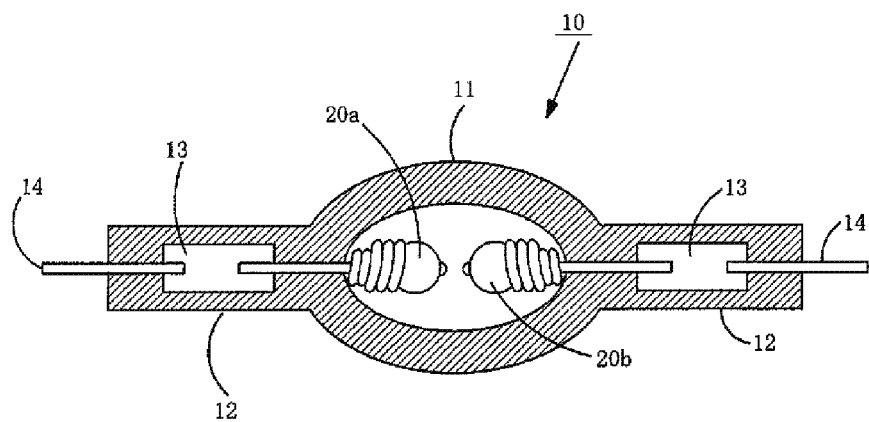
FIG. 1 is a cross-sectional view of a high pressure discharge lamp of an embodiment of the present invention.

FIG. 1 is a cross-sectional view of a high pressure discharge lamp of an embodiment of the present invention.

A high pressure discharge lamp 10 includes a substantially spherical shaped light-emitting portion 11 formed by a discharge container formed of quartz glass. A pair of electrodes 20a and 20b are arranged so as to oppose each other at an extremely small distance of 2 mm or smaller in the light emitting portion 11. Also, sealed portions 12 are formed at both end portions of the light-emitting portion 11. The sealed portions 12 each include a metallic foil 13 of electric conduction formed of molybdenum embedded therein in an air-tight manner by shrink sealing for example. A shaft portion of each of the electrodes 20a and 20b is joined to one end of the metallic foil 13, and an external lead 14 is joined to another end of each of the metallic foils 13, whereby power is supplied from a power supply apparatus (30).

Mercury, rare gas, and halogen gas are enclosed in the light-emitting portion 11. The mercury is provided for obtaining radiant light having a visible light wavelength required for being used as a power source for a projector or the like, for example, a wavelength from 360 to 780 nm, and in terms of figures, an amount of 0.20 mg/mm$^3$ or more is enclosed. The enclosed amount, although varying depending on temperature conditions, realizes a vapor pressure as high as 200 atmospheric pressure or higher in the interior of the discharge container at the time of lighting. Also, by encapsulating a larger amount of mercury, a high pressure discharge lamp having a high mercury vapor pressure such as a mercury vapor pressure of 250 atmospheric pressure or higher, or 300 atmospheric pressure or higher can be manufactured at the time of lighting, and the higher the mercury vapor pressure, the more suitable light source for the projector is realized.

As the rare gas, for example, approximately 13 kPa of argon gas is enclosed. The function thereof is to improve a lighting startability.

Also, as the halogen, on the other hand, iodine, bromine, chlorine, or the like are enclosed in a form of a compound with mercury or other metal. The amount of encapsulation of halogen is selected from a range between 10$^{-6}$ μmol/mm and 10$^{-2}$ μmol/mm$^3$. The function of halogen is elongation of lifetime using so-called a halogen cycle. However, the high pressure discharge lamp having an extremely compact profile and an extremely high lighting vapor pressure like that of the invention also has a function of prevention of devitrification of the discharge container.

In terms of figures of the high pressure discharge lamp, for example, the maximum outer diameter is 9.4 mm at a light-emitting portion, the distance between the electrodes is 1.0 mm, the capacity of the interior of the discharge container is 55 mm$^3$, the rated voltage is 70V, and the rated power is 180 W, and power is supplied in an alternating current system.

Also, the high pressure discharge lamp of this type is configured to be integrated in a projector which is in the course of miniaturization, and an extreme miniaturization is required as an entire size on one hand, and a large amount of light emission is also required on the other hand. Therefore, thermal influence in the light-emitting portion is extremely strict. A tube wall load value of the lamp is 0.8 to 2.5 W/mm$^2$, specifically, 2.4 W/mm$^2$.

When having such a high mercury vapor pressure or a high tube wall load value is employed in a presentation instrument such as a projector or an overhead projector, radiant light with color ending properties may be provided.

Figure 2:
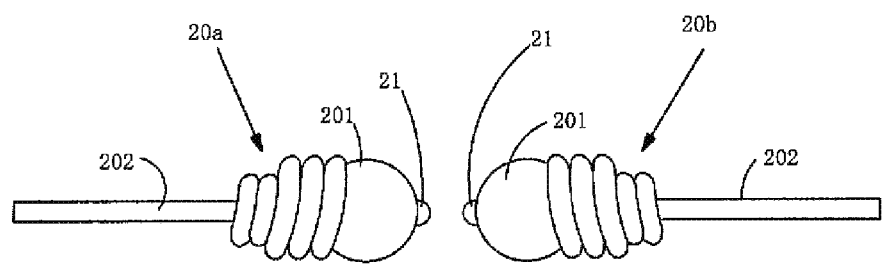
FIG. 2 illustrates distal ends of electrodes illustrated in FIG. 1 in a schematic manner.

FIG. 2 illustrates distal ends of the electrodes illustrated in FIG. 1 in a schematic manner and an explanatory drawing for explaining projections formed at distal ends of the electrodes when the lamp is in operation. The electrodes 20a and 20b are each composed of a spherical portion 201 and a shaft portion 202, and projections 21 are each formed at a distal end of the spherical portion 201. The projections 21 are formed of tungsten fused at the distal ends of the electrodes by aggregation when the lamp is lighting.

Figure 3:
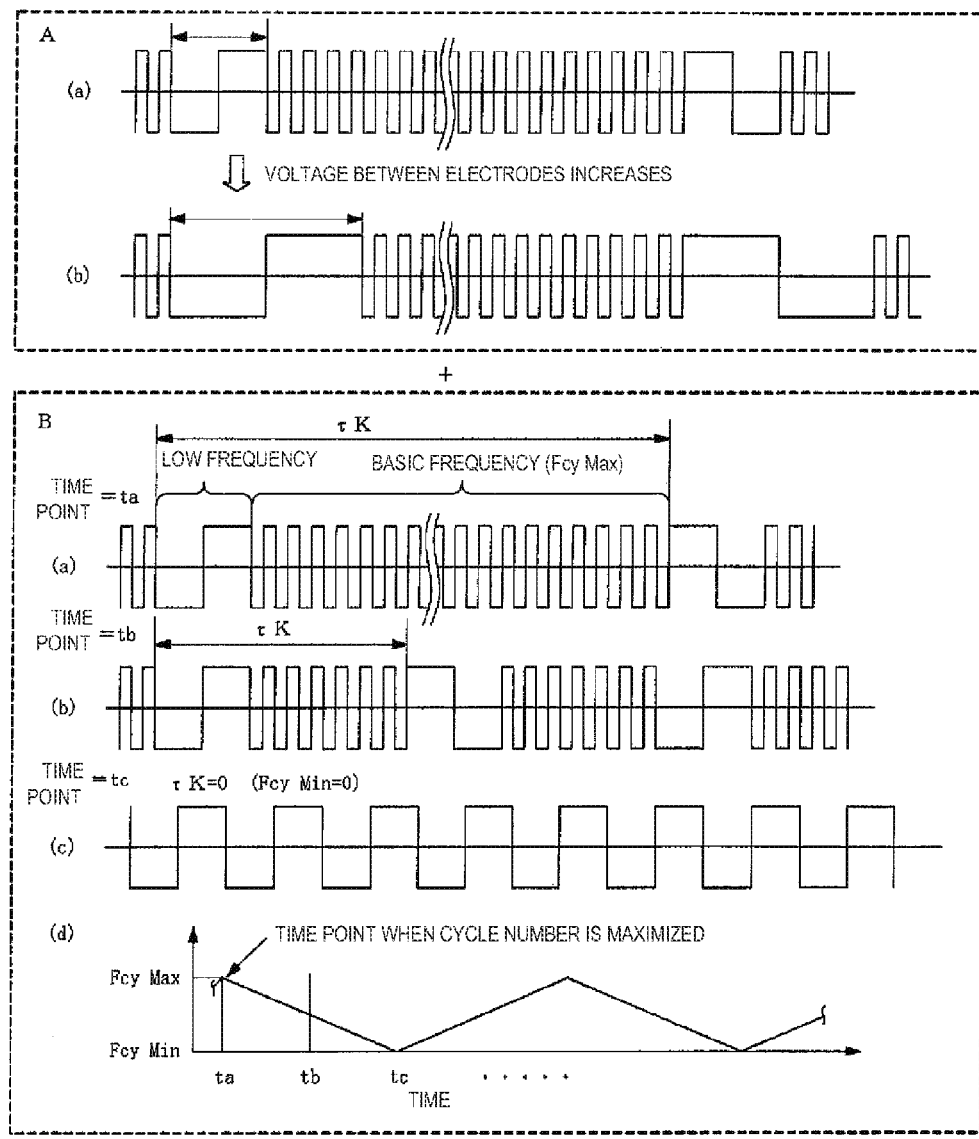
FIG. 3 is a drawing for explaining an outline of a lighting waveform of the discharge lamp of the present invention.

A high pressure discharge lamp lighting apparatus of an example of the present invention will be described below, and first of all, an outline of a system of lighting the discharge lamp of the present invention will be described. FIG. 3 is a drawing for explaining an outline of a lighting waveform of the discharge lamp of the present invention. FIG. 3A illustrates a lighting system described in Patent Literature 1 described above (hereinafter referred to as a lighting system A), the drawings A(a) and (b) in the same figure illustrate an example of a current waveform of a lamp supplied to the discharge lamp, in which a vertical axis represents a current value, and a lateral axis represents time, the drawing A(a) in the same figure illustrates a case where the lamp voltage is low and the drawing A(b) in the same figure illustrates a case where the lamp voltage is high.

As described above, when the lamp voltage is low, as illustrated in the drawing A(a) in the same figure, an alternating current having a high frequency which is basic at the time of steady lighting (basic frequency) is supplied, and a frequency, which is a frequency lower than the basic frequency at a predetermined interval (low frequency) is supplied. Then, when the lamp voltage is increased, as illustrated in the drawing A(b) in the same figure, a width of the above-described low frequency supplied at the predetermined interval is increased (the frequency is lowered).

FIG. 3B is a drawing illustrating a lighting system used in combination with the lighting system A described above (hereinafter, referred to as lighting system B) of the present invention, the drawings (a) to (c) in the same figures illustrate an example of a current waveform of the lamp supplied to the discharge lamp, in which a vertical axis represents a current value, and a lateral axis represents time, and the drawing (d) in the same figure illustrates an example of a change pattern of the cycle number of the basic frequency in which a vertical axis represents the generated cycle number (number of times) of the basic frequency and a lateral axis represents time.

As illustrated in FIG. 3B, in the lighting system B, as illustrated in the drawings B(a), (b), and (c) in the same figures, a period in which the basic frequency is output (the basic frequency cycle number) is decreased little by little and, simultaneously, a period in which the low frequency is output (the low-frequency cycle number) is increased little by little and, when the period in which the basic frequency is output (the basic frequency cycle number) reaches a minimum value, the period in which the low frequency is output (low-frequency cycle number) is decreased little by little while increasing the period in which the basic frequency is output (the basic frequency cycle number) little by little. In other words, the cycle number of the basic frequency repeats increase and decrease with time at a constant rate as illustrated in the drawing B(d) in the same figure.

As illustrated in FIG. 3(d), the period in which the high frequency (basic frequency) is output can be shortened little by little by changing the set value so as to be decreased at a rate of variability of one cycle per second from a preset maximum cycle number FcyMax and, when a preset minimum cycle number FcyMin is reached as a result of decrease, the period in which a high frequency is output can be increased little by little by increasing by one cycle per second.

While the description here is given with the rate of variability of one cycle per second as an example, these figures are not limited and may be set arbitrarily.

FIG. 4 illustrates an example of transition of the waveform in a case where the lighting system A and the lighting system B described above are combined, in which a vertical axial represents a current value, and a lateral axis represents time. The drawing (a) in the same figure illustrates a case where the lighting voltage is low, and the drawing (b) in the same figure illustrates a case where the lighting voltage is low. The same figure illustrates an example of the waveform in a case where the following lamp is lit.

| Lamp | 275 W |
|---|---|
| Rated Voltage | 80 V |
| Lamp Capacity | 80 mm$^3$ |
| Distance between Electrodes | 1.2 mm |
| Amount of Mercury | 0.28 mg/mm$^3$ |
| Rare Gas (specifically, argon) | 13 kPa |
| Amount of Halogen (for example, iodine, bromine, and chlorine) | $10^{-6}$ to $10^{-2}$ μmol/mm$^3$ |

As illustrated in FIG. 4, when the lighting voltage is low (for example, 70V), the cycle number of the basic frequency is increased and decreased with time as S1→S2→S3→S4 in the drawing (a) in the same figure. When the lighting voltage is increased (for example, 90V) here, the state transits to a state illustrated in the drawing (b) in the same figure.

In other words, the state transits from (a) to (b) in S5, in which the width of the low frequency is increased, and the cycle number of the basic frequency is increased and decreased with time like S6→S7→S8→S9→S10. In other words, the width of the low frequency is changed in accordance with the lighting voltage as illustrated in FIG. 3A described above, and the cycle number of the basic frequency is increased and decreased at a constant rate with time as illustrated in FIG. 3B.

In the present invention, when there is no variation in lamp voltage as described above, as illustrated in FIG. 3B, the discharge lamp is lit while increasing and decreasing the period in which the basic frequency is output (the basic frequency cycle number) and, when the lamp voltage is, for example, increased, the width of the low frequency is increased as illustrated in FIG. 3A, and the discharge lamp is lit while increasing and decreasing the period (the basic frequency cycle number) in which the basic frequency is output in the same manner as described above.

In this manner, by supplying a low frequency having a width in accordance with the lighting voltage by the lighting system A, and then supplying a current load in accordance with the lighting voltage to the projection, the shape of the projection is stabilized and the flicker is suppressed and, in addition, by lighting the lighting system B, the displacement of the projection is suppressed, the lowering of the luminance is suppressed, and no excessive load is applied to the electrode.

Consequently, increase in lighting voltage is suppressed, and blackening is also suppressed as synergetic effects.

In other words, by lighting the lamp by combining the lighting system A and the lighting system B, lowering of the luminance maintenance ratio is suppressed as described above and, in addition, only the projection which is to be an original point of the arc is generated and maintained even when the lamp voltage varies, so that elongation of the lifetime of the lamp is achieved.

Subsequently, a lamp lighting apparatus according to the embodiment of the present invention will be described with reference to FIG. 5. In the same figure, the lamp lighting apparatus includes the power supply apparatus 30 configured to light the high pressure discharge lamp and the high pressure discharge lamp 10.

The power supply apparatus 30 includes a step-down chopper circuit U1 configured to receive a supply of a direct current voltage Vdc and step down the same, a full-bridge type inverter circuit U2 connected to an output side of the step-down chopper circuit U1 and configured to change a direct current voltage to an alternating current voltage and supply the same to the discharge lamp 10 (hereinafter, referred to also as (full bridge circuit)), a starter circuit U3 including a coli Lh and a capacitor Ch connected to the high pressure discharge lamp 10 in series, a driver 51 configured to drive switching elements Q1 to Q4 of the full-bridge circuit U2 described above, and a control unit U4.

The control unit U4 may be composed of a processing apparatus such as a microprocessor for example, and in this figure, the function configuration thereof is illustrated in a block diagram.

Figure 5:
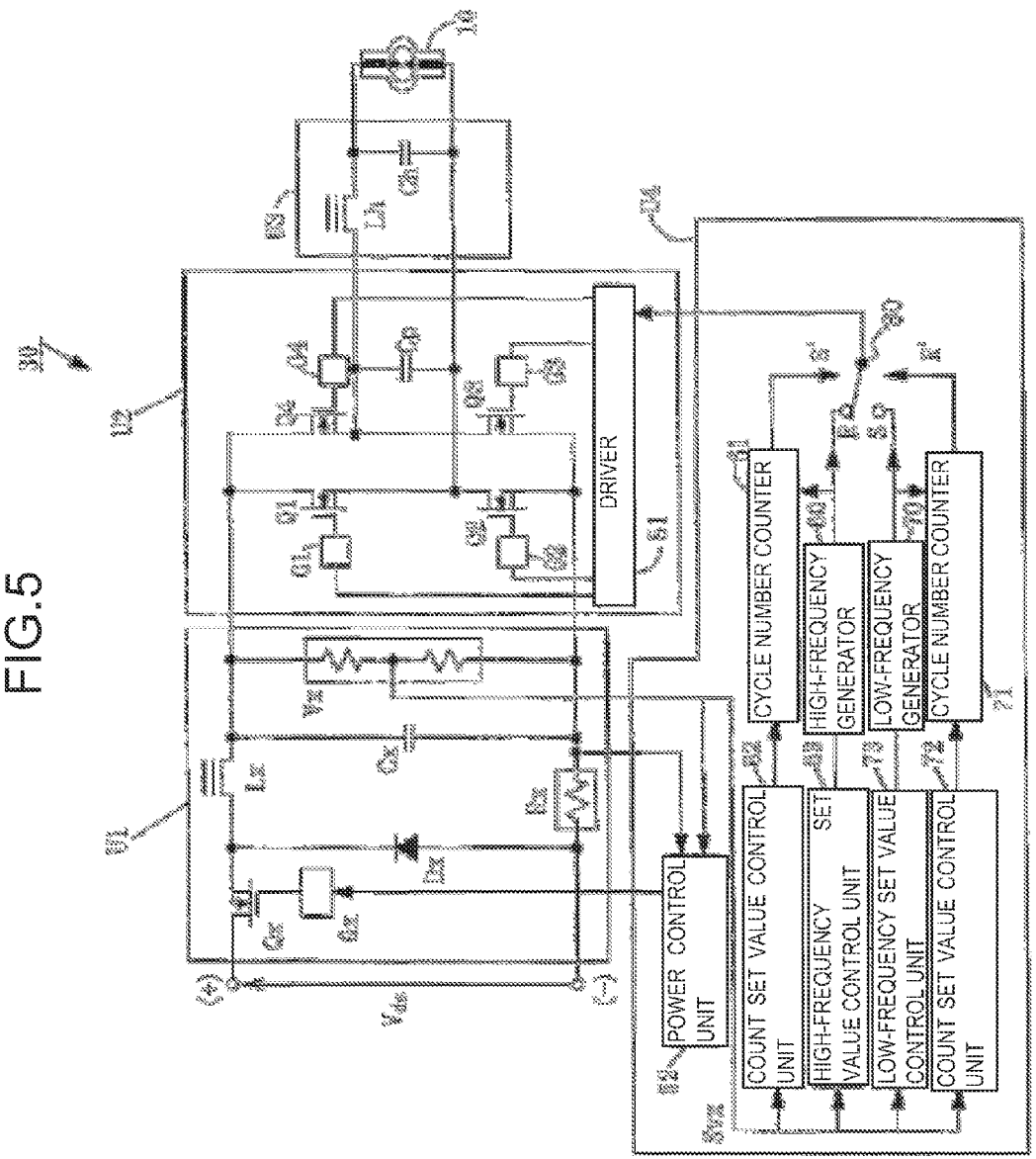
FIG. 5 is a drawing illustrating a configuration of a lamp lighting apparatus according to an embodiment of the present invention.

In FIG. 5, the step-down chopper circuit U1 includes a switching element Qx and a reactor Lx connected to a + side power source terminal to which the direct current voltage Vdc is supplied, a diode Dx whose cathode side is connected between a connecting point between the switching element Qx and the reactor Lx and a − side power source terminal, a smoothing capacitor Cx connected to an output side of the reactor Lx, and a resistance Rx for detecting a current connected between − side terminal of the smoothing capacitor Cx and an anode side of the diode Dx.

The switching element Qx described above is driven by a gate signal Gx output from the control unit U4, and driving of the switching element Qx at a predetermined duty steps down the input direct current voltage Vdc to a voltage in accordance with the duty. A series circuit Vx of a resistance for detecting a voltage is provided on an output side of the step-down chopper circuit U1.

The full-bridge circuit U2 includes the switching elements Q1 to Q4 connected in a bridge, and these switching elements Q1 to Q4 are driven by gate signals G1 to G4 output from the driver 51, and a square wave-shaped alternating current voltage is generated between a connecting point between the switching elements Q1 and Q2 and a connecting point between the switching elements Q3 and Q4 by alternately turning ON the switching elements Q1 and Q4, and the switching elements Q2 and Q3 arranged diagonally.

The starter circuit U3 is composed of the coil Lh and the capacitor Ch. A resonance frequency of a resonance circuit composed of the coil Lh and the capacitor Ch is output from the full-bridge circuit U2, whereby the capacitor Ch is caused to generate a high voltage by a resonant action thereof.

Therefore, the starter circuit U3 is operated at a high frequency only at the time of starting, and a high voltage is applied to both ends of the discharge lamp 10, and hence the lamp is lit.

Changing the drive frequency of the full-bridge circuit U2 at the time when the lamp is steady in the above-described circuit is achieved by adjusting the switching frequencies of the switching elements Q1 to Q4 of the full-bridge circuit U2, and an output voltage is achieved by adjusting the operating duty of the switching element Qx of the step-down chopper circuit U1.

The switching element Qx of the step-down chopper circuit U1 is turned ON/OFF in accordance with the duty of the gate signal Gx output from the control unit U4, so that power supplied to the lamp 10 is changed. In other words, in the case of increasing power, the gate signal Gx is controlled for example by lowering the duty of Qx so that the power value matches the input power adjustment signal value.

The control unit U4 includes a power control unit 52 configured to control lamp power, a high-frequency set value control unit 63 configured to determine the high frequency (basic frequency) and a high-frequency generator 60 configured to generate a signal upon reception of the high frequency, a first cycle number counter 61 configured to count the cycle number of the high-frequency signal output from the high-frequency generator 60, and a first count set value control unit 62 configured to maintain the set value of the count value of the high-frequency signal output from the high-frequency generator 60.

Also, the control unit U4 includes a low-frequency set value control unit 73 configured to determine the low frequency lower than the basic frequency and a low-frequency generator 70 configured to generate a signal upon reception of the low frequency, a second cycle number counter 71 configured to count the cycle number of the low-frequency signal output from the low-frequency generator 70, a second count set value control unit 72 configured to maintain the set value of the count value of the low-frequency signal output from the low-frequency generator 70, and a selector 80 configured to output an output from either one of the high-frequency generator 61 and the low-frequency generator 71 selectively to the driver 51.

The power control unit 52 calculates lamp power by obtaining a lamp current I and a lamp voltage V from voltages at both ends of the resistance Rx for detecting a current and a voltage detected by the resistance Vx for detecting a voltage, and controls the duty of the switching element Qx of the step-down chopper circuit U1 so that the power matches a lighting power command.

The drive frequency output from the full-bridge portion U2 of the present invention basically has a waveform in which a high frequency (basic frequency) and a low frequency lower than that are combined as illustrated in FIG. 3A described above.

The high frequency described here corresponds to a basic frequency of steady lighting of the high pressure discharge lamp described above, and the low frequency corresponds to a frequency of an alternating current inserted regularly into the basic frequency described above.

As disclosed in Patent Literature 1 described above, the basic frequency described above is selected from a range between 60 and 1000 Hz, the low frequency has a frequency lower than the basic frequency selected from the range between 60 and 1000 Hz described above and is selected from a range between 5 and 200 Hz.

Also, the above-described low frequency is a length longer than half a cycle, and the low frequency when the basic frequency and a low-frequency alternating current are generated alternately has a length not longer than 5 cycles, and an interval from generation of the above-described low-frequency alternating current until generation of a next low-frequency alternating current is not longer than 120 seconds. The frequency of the above-described low frequency and the length to be inserted and the interval of insertion are selected on the basis of a relationship with respect to a design of the discharge lamp, specifically, thermal design of the electrode.

By supplying the alternating current having a waveform including the high frequency and the low frequency combined together as described above, the low-frequency alternating current can be supplied to fuse the distal end portion of the electrode, thereby preventing generation of needless projection other than the projection which serves as an original point of the arc.

When the high pressure discharge lamp is steadily lit at a frequency from 60 Hz to 1000 Hz, formation of a second projection is started in an intermediate temperature area on the surface of the electrode. The second projection is a projection which does not practically contribute to discharge, that is, an unnecessary projection. When such the second projection is formed, if the frequency is switched to a frequency lower than the frequency for the steady lighting, the temperature of the distal end of the electrode is increased during the operation as the anode because the anode operation period is long. This increased temperature is transmitted to an intermediate temperature area where the second projection generates and increases the temperature on the surface of the electrode in this range, so that the second projection started to be formed is evaporated, is eaten away, and is disappeared.

Here, in order to suppress the second projection from generating and growing, temporary changing the temperature on the surface of the electrode is essentially important. In cases where the low frequency is lower than 5 Hz, where the low frequencies are continuously generated at intervals of smaller than 0.01 seconds, and where the low frequencies are continuously generated beyond 5 cycles, the increase of the temperature of the distal end of the electrode becomes too large, and hence not only the second projection, but also the first projection which is inevitably necessary for the super-high pressure discharge lamp according to the present invention is disappeared.

In contrast, in a case where the low frequency exceeds 200 Hz, or where the frequency lower than half a cycle is inserted, the second projection cannot be prevented from generating and growing because a sufficient temperature increase in the intermediate temperature area where the second projection is generated is not achieved. Furthermore, in a case where the intervals of the generation of the low frequency exceeds 120 seconds, the second projection grows to an extent that cannot be eaten out during the steady lighting.

The present invention achieves advantages that allow for complete suppression of generation and growing of unnecessary projections which do not substantially contribute to discharge by having the basic frequency to be supplied to the high pressure discharge lamp within a range between 60 and 1000 Hz, the low-frequency alternating currency being an alternating current having a frequency selected from a range between 5 and 200 Hz, which is lower than the frequency of the alternating current of the basic frequency, and having a length of half a cycle or longer, the low frequency when the basic frequency and the low-frequency alternating current are generated alternately having a length of 5 cycles or shorter, and an interval from generation of a low-frequency alternating current until generation of a next low-frequency alternating current being 120 seconds or shorter.

In the control unit U4 illustrated in FIG. 5, a drive signal of the full-bridge circuit U2 is determined as follows.

In FIG. 5, on the basis of a frequency determined by the high-frequency set value control unit 63, a square wave-shaped signal having a Duty (On/Off ratio) of 50% is generated and output from the high-frequency generator 60 at a high frequency (basic frequency). The selector 80 is assumed to be selected to an R side, and in this case, the signal of the high-frequency generator 60 is sent to the driver 51 via the selector 80.

Accordingly, the gate signals G1 to G4 are supplied to switching elements Q1 to Q4 of the full-bridge circuit U2 from the driver 51, and the switching elements Q1 to Q4 are driven at a frequency corresponding to the above-described high-frequency signal.

Then, a square wave-shaped alternating current voltage having the frequency of the above-described high-frequency signal is generated from the full-bridge type inverter circuit U2. This alternating current voltage is supplied to the discharge lamp 10.

Also, the cycle number of the high-frequency signal from the high-frequency generator 60 is counted by the cycle number counter 61. The count set value control unit 62 has a function to hold the set value of the cycle number counter 61, and the cycle number counter 61 outputs a signal S' and switches the selector 80 to S side if the counted cycle number matches the set value, that is, upon completion of the high-frequency signal by a predetermined cycle number. Also, simultaneously, the operation of the high-frequency generator 60 is stopped and the low frequency generator 70 is activated.

Subsequently, a low-frequency square wave-shaped signal having a Duty of 50% is generated and output from the low-frequency generator 70 on the basis of the frequency determined by the low-frequency set value control unit 73, and when the selector 80 is switched to the S side, a low-frequency signal is sent from the low-frequency generator 70 to the driver 51. Accordingly, the gate signals G1 to G4 are supplied to the switching elements Q1 to Q4 of the full-bridge circuit U2 from the driver 51, and the switching elements Q1 to Q4 are driven at a frequency corresponding to the above-described low-frequency signal. Then, a square wave-shaped alternating current voltage having the frequency of the above-described low-frequency signal is generated from the full-bridge circuit U2. This alternating current voltage is supplied to the discharge lamp 10.

For example, when the width of the low frequency is changed as described above in accordance with the lighting voltage (lamp voltage), the set value of the low-frequency set value control unit 73 is controlled on the basis of a voltage signal Svx which is a signalized lighting voltage.

The cycle number of the signal from the low-frequency generator 70 is counted by the cycle number counter 71. The count set value control unit 72 has a function to hold the set value of the cycle number counter 71, and the cycle number counter 71 outputs a signal R' and switches the selector 80 to R side if the counted cycle number matches the set value, that is, upon execution of the low-frequency signal by a predetermined cycle number, and the low-frequency generator 70 is stopped and the high-frequency generator 60 is activated. Accordingly, an output goes from the low-frequency generator 60 to the driver 51, and hence the full-bridge type inverter circuit U2 outputs a high-frequency alternating current voltage again.

An example of setting described above will be given below.

| | |
|---|---|
| high-frequency generator 60 | 370 Hz |
| count set value control unit 62 | 100.5 cycles |
| low-frequency generator 70 | 90 Hz |
| count set value control unit 72 | 1 cycle |

A control system of the present invention is characterized in that the set value of the count set value control unit 62 is controlled with time sequentially to control the period in which the basic frequency is supplied to increase or decrease little by little at a predetermined interval (lighting system B described above) and when the lighting voltage is changed, a low frequency determined by the low-frequency set value control unit 73 is supplied (lighting system A described above).

In other words, as illustrated in FIG. 3B described above, the period in which the high frequency (basic frequency) is output is shortened little by little by changing the set value so that the cycle number is decreased at a predetermined rate of variability from a preset maximum cycle number FcyMax and, when a preset minimum cycle number FcyMin is reached as a result of decrease, the period in which a high frequency is output can be increased little by little by increasing by one cycle per second (lighting system B described above), and when the lighting voltage is changed, the low frequency determined by the low-frequency set value control unit 63 is supplied as illustrated in FIG. 3A described above (lighting system A described above).

Therefore, in the present invention, as illustrated in FIG. 5, the low-frequency set value control unit 73 is controlled on the basis of the voltage signal Svx which is a signalized lighting voltage (lamp voltage). Furthermore, it is also possible to control the set values of the high-frequency set value control unit 63, the count set value control unit 62, the count set value control unit 72 on the basis of the voltage signal Svx.

In other words, in the above-described description, when the lighting voltage of the discharge lamp is changed, the width of the low frequency is changed. However, the low-frequency cycle number may be changed as well correspondingly.

Changes of parameters relating to the set values of the high-frequency set value control unit 63, the count set value control unit 62, and the count set value control unit 72 may be achieved by changing one of those, or two or all three of the elements. In addition, when the lighting voltage of the discharge lamp is changed, the parameter of the high frequency (basic frequency), for example, the frequency, may also be changed.

The expression "in accordance with the change of the lighting voltage of the discharge lamp" includes not only a case of controlling linearly in response to the change of the lighting voltage, but also a case of providing a threshold value of the voltage value and changing the parameter of the low frequency when the voltage value is either more or less than the threshold value.

For example, when the lamp voltage is increased, the frequency of the low-frequency wave is lowered. The reason is that the decrease of the lamp current is compensated to increase the temperature of the surface of the electrode by increasing the period of the anode operation. In addition, when the lamp voltage is increased, the number of waves of the low frequency may be increased. The reason is that the period in which the low frequency is inserted at once is increased, and hence disappearance of the second projection may be accelerated by increasing the frequency of temperature change on the surface of the electrode.

Furthermore, when the lamp voltage is increased, the high-frequency (the basic frequency) may be enhanced. The reason is that the lamp voltage can be lowered by using a characteristic that the height of the first projection is increased with an increase of the steady frequency.

Although the case where the lamp voltage is increased has been described thus far, the respective parameters are changed in an opposite way when the lamp voltage is lowered (that is, when the lamp current is increased).

The expression "in accordance with the change of the lighting voltage of the discharge lamp" includes not only a case of controlling linearly in response to the change of the lighting voltage, but also a case of providing a threshold value of the voltage value and changing the parameter of the low frequency when the voltage value is either more or less than the threshold value.

In the present invention, as described above, the set value of the count set value control unit 62 is controlled with time in sequence and the cycle number of the basic frequency is increased or decreased. In the following description, conditions or the like which increases or decreases the number of cycles of the basic frequency in the present invention will be described in detail.

The basic frequency generating period and the rate of variability of the basic frequency described above are preferably set so as to satisfy Condition 1 and Condition 2 described below.

[Condition 1] The basic frequency generating period is set to a value between two times to 100 times, inclusive, of the half cycle (s) of the frequency of the low-frequency wave at timing when the cycle number becomes a maximum value.

[Condition 2] When the period required for increasing or decreasing the cycle number of the basic frequency by one cycle is referred to as "cycle increasing and decreasing speed (s), the cycle increasing and decreasing speed (s) is set to a value between 0.5 s to 10 s inclusive.

For example, "the cycle increasing and decreasing speed is 1 s" means that the cycle number of the basic frequency is increased and decreased by one cycle every elapse of 1 s.

[Reason of Condition 1]

The reason why the setting as Condition 1 described above is desirable is as follows.

In order to maintain the shape of the projection desirably, it is necessary to set the period in which the basic frequency is formed continuously to an adequate range at a time point when the cycle number of the basic frequency becomes a maximum cycle number (FcyMax) illustrated in FIG. 3B(d) described above.

In a case where the period in which the basic frequency is to be generated is too short at a time point when the cycle number of the basic frequency becomes a maximum value, the widths of FcyMax and FcyMin become small, which is equivalent to having little swing width, so that the distal end of the electrode is tapered and the projecting shape gets distorted. In order to avoid such a problem, the period in which the basic frequency is to be generated is desirably double or more of half a cycle of the low frequency.

In contrast, in a case where the period in which the basic frequency is to be generated is too long, the time length from the generation of the low frequency to the next generation of the low frequency is increased and hence the temperature of the electrode becomes lower, which makes the low load area become too long. Therefore, a wear mode is resulted and the projection gets distorted.

Therefore, the period in which the basic frequency is to be formed is desirably set to a range not more than 1000 times.

[Reason of Condition 2]

The reason why the setting as Condition 2 described above is desirable is as follows.

When a cycle increasing and decreasing speed is too fast, the temperature of the electrode cannot follow that change, so that an effect of swing cannot be obtained and the shape of the projection gets distorted.

For example, in the case where the cycle increasing and decreasing speed is 0.2 s, 5 cycles are increased or decreased in 1 s. In this case, gentle change of the temperature at the distal end of the electrode cannot be achieved. There is no result of swinging, and hence the temperature at the distal end of the electrode cannot be heated over a wide range. The shape of the distal end of the electrode is distorted, and hence a stable discharge cannot be maintained.

When the cycle increasing and decreasing speed reaches 0.5 s (two cycles are increased and decreased per elapse of 1 s), the temperature at the distal end of the electrode can follow the increase and decrease of the cycle, so that the temperature of the distal end of the electrode can be heated over a wide range. Consequently, the projection at the distal end can be maintained.

The increasing and decreasing speed of the generation interval of the low-frequency alternating current (the period in which one cycle of the basic frequency is increased and decreased) is preferably 0.5 or higher.

In contrast, in a case where the cycle increasing and decreasing speed is too slow, the period in which the load is high for the electrode, in other words, the state in which the electrode temperature is low, becomes too long, so that the projection at the distal end gets distorted.

For example, when the cycle increasing and decreasing speed is 20 s (one cycle is increased and decreased at every elapse of 20 s), since the period in which the load is high is long, lowering of the electrode temperature may result, and the projection at the distal end cannot be maintained. Also, when the increasing and decreasing speed of the cycle becomes 10 s (one cycle is increased and decreased at every elapse of 10 s), control of the temperature at the distal end of the electrode from low temperatures to high temperatures is enabled, so that the projection at the distal end can be maintained.

From this reason, the increasing and decreasing speed of the generation interval of the low-frequency alternating current (the period in which one cycle of the basic frequency is increased and decreased) is preferably 10 or lower. As a matter of course, these set values may be set so that a plurality of cycles such as two cycles or three cycles increase and decrease step by step as long as required conditions are satisfied.

A detailed example of the current waveform of the present invention and an example of a change pattern of the cycle number set value in the count set value control unit 62 described above will be described below.

Here, specifications of the lamp and conditions of the operation of the lamp used in the example described below are as follows.

[Specification of Lamp of Example]
Rated power: 270 W
Rated voltage: 80V
Capacity of Light-Emitting Portion: 80 mm$^3$
Distance between Electrodes: 1.2 mm
(Enclosed Substance)
Amount of Mercury: 0.28 mg/mm$^3$
Rare Gas (specifically, argon gas): 13 kPa Amount of Halogen (for example, iodine, bromine, chlorine): $10^{-6}$ to $10^{-2}$ μmol/mm$^3$

[Lamp Operation Conditions]
Basic Frequency: 370 Hz
Frequency of Low Frequency: 46.25 Hz, 92 Hz
Minimum Interval of Insertion of Low Frequency: 0 ms
Maximum Interval of Insertion of Low Frequency: 300 ms
Cycle Increasing and Decreasing Speed: 1 cycle/2 s Pattern Example 1

Case where Number of Times of Generation of Basic Frequency Becomes 0

Figure 6:
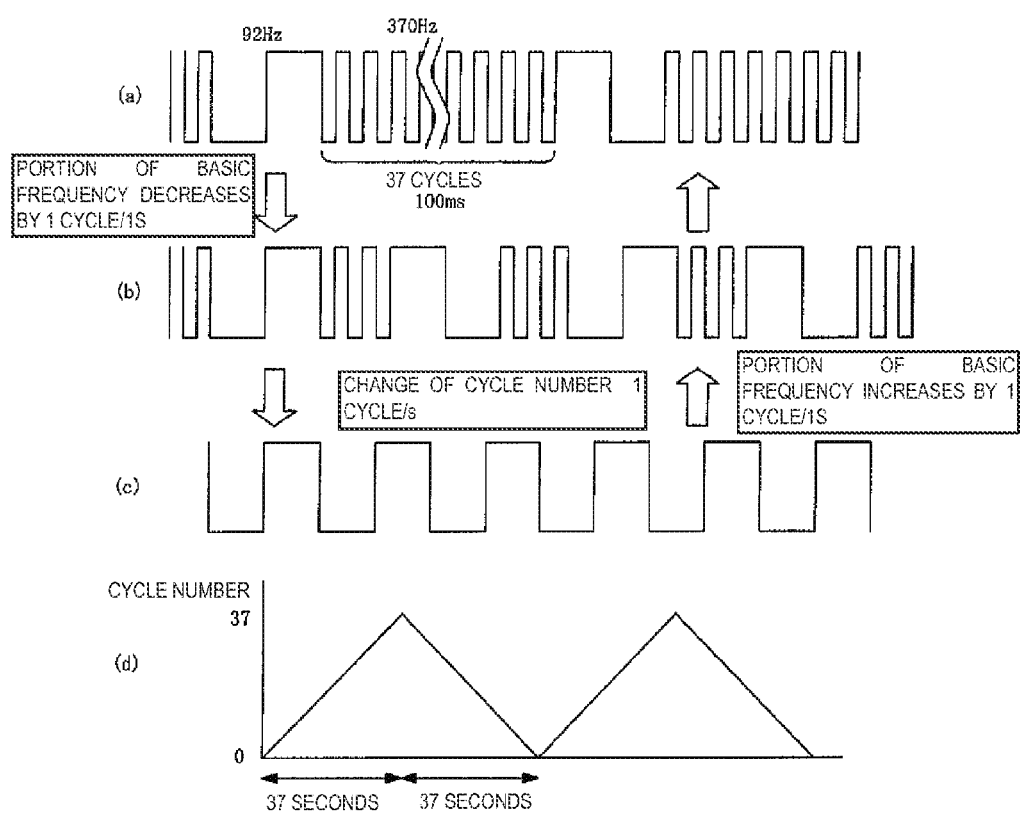
FIG. 6 is a drawing illustrating a current waveform of a lamp to be supplied to a high pressure discharge lamp and Change Pattern Example 1 of a set value of a cycle number of a basic frequency.

FIG. 6 is a drawing illustrating a current waveform of a lamp to be supplied to a high pressure discharge lamp and Change Pattern Example 1 of a set value of a cycle number of a basic frequency. The drawings (a) to (c) in the same figure illustrate current waveforms, in which a vertical axis represents a current value, and a lateral axis represents time. Also, the drawing (d) in the same figure illustrates a change pattern of the set value of the cycle number, in which a vertical axis represents generated cycle numbers (number of times) of the basic frequency, and a lateral axis represents time.

As illustrated in FIG. 6(d), the period in which the high frequency (basic frequency) is output is elongated little by little by changing so that the cycle number of the basic frequency is increased at a rate of variability of one cycle per second from 0 and, when a preset maximum cycle number is reached, the period in which a high frequency is output can be shortened little by little by decreasing by one cycle per second at this time.

Accordingly, the current waveform is changed as the drawings (a)→(b)→(c)→(b)→(a) in the same figure.

In terms of figure in the example described above, the value of the basic frequency is 370 Hz, and the value of the frequency of the low-frequency wave is 92 Hz. The number of times of generation of the frequency of the low-frequency wave in the FIG. 6(a) to (c) is one cycle.

Pattern Example 2

Case where Number of Times of Generation of Basic Frequency does not Become 0

Figure 7:
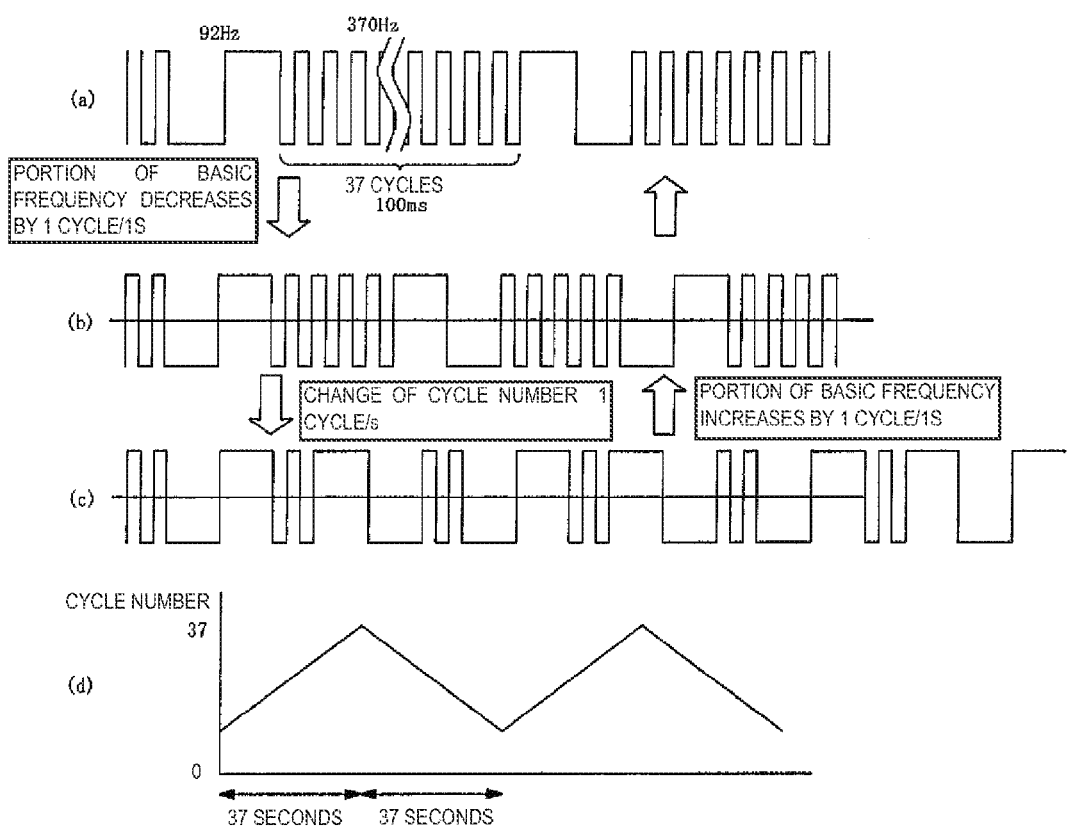
FIG. 7 is a drawing illustrating a current waveform of the lamp and Change Pattern Example 2 of the set value of the cycle number of the basic frequency of the present invention.

FIG. 7 is a drawing illustrating a current waveform of the lamp to be supplied to the high pressure discharge lamp and Change Pattern Example 2 of the set value of the cycle number of the basic frequency. The drawings (a) to (c) in the same figure illustrate current waveforms, in which a vertical axis represents a current value, and a lateral axis represents time. Also, the drawing (d) in the same figure illustrates a change pattern of the set value of the cycle number, in which a vertical axis represents the generated cycle number (number of times) of the basic frequency, and a lateral axis represents time.

As illustrated in FIG. 7(d), the period in which the high frequency (basic frequency) is output is elongated little by little by changing so that the cycle number of the basic frequency is increased at a rate of variability of one cycle per second from FcyMin and, when a preset maximum cycle number is reached, the period in which a high frequency is output can be shortened little by little by decreasing by one cycle per second at this time.

Accordingly, the current waveform is changed as the drawings (a)→(b)→(c)→(b)→(a) in the same figure.

Pattern Example 3

Case where Generation Cycle of Frequency of Low-Frequency Wave is 0.5 (Half a Cycle)

Figure 8:
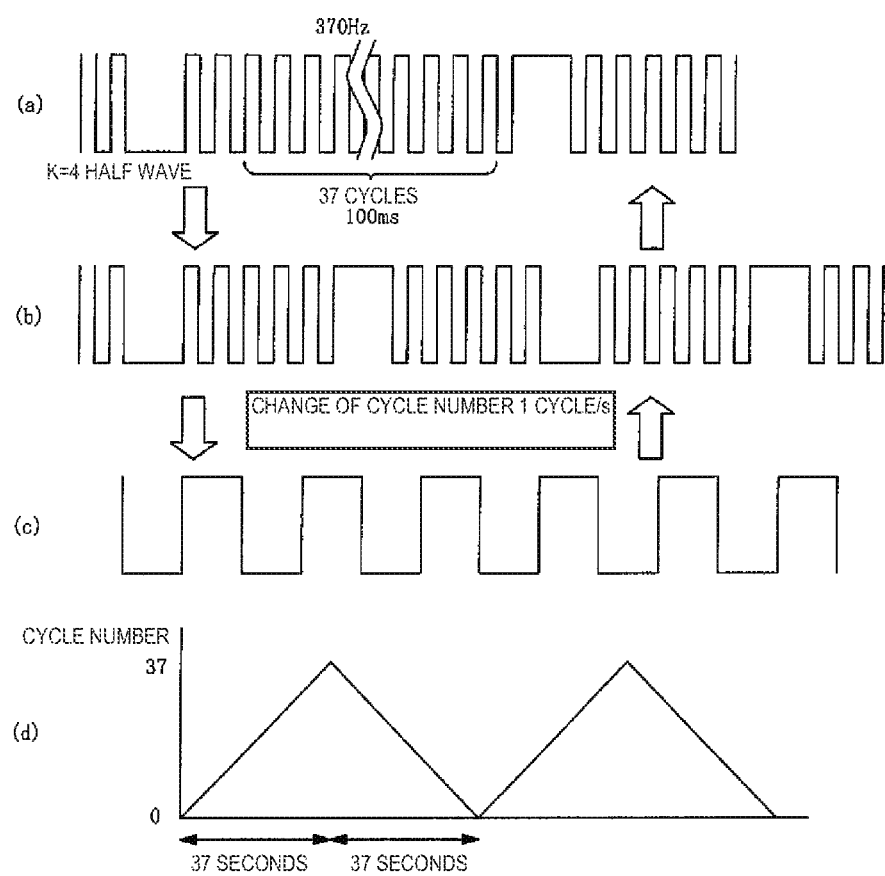
FIG. 8 is a drawing illustrating a current waveform of the lamp and Change Pattern Example 3 of the set value of the cycle number of the basic frequency of the present invention.
Figure 12:
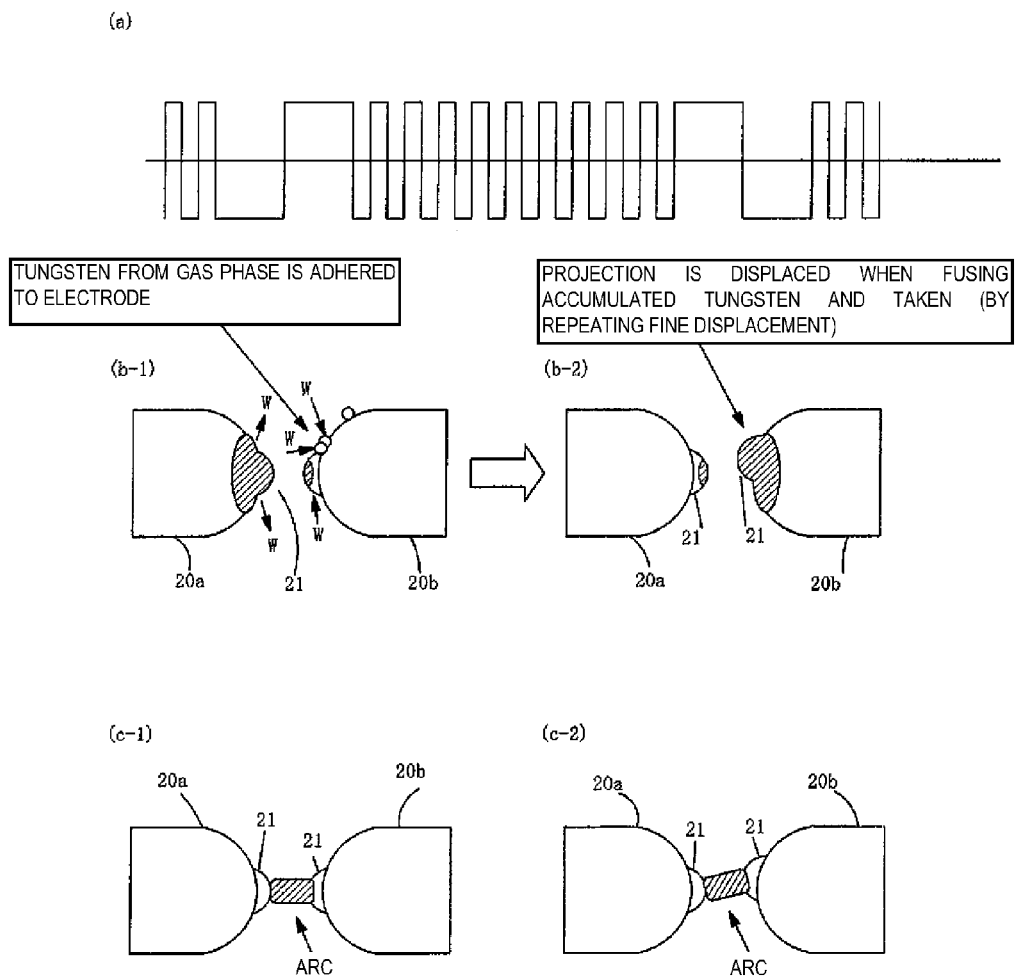
FIG. 12 is a drawing illustrating a state of electrode when the lamp is lit in the lighting system illustrated in FIG. 11.

FIG. 8 is a drawing illustrating a current waveform of the lamp to be supplied to the high pressure discharge lamp and Change Pattern Example 3 of the set value of the cycle number of the basic frequency. The drawings (a) to (c) in the same figure illustrate current waveforms, in which a vertical axis represents a current value, and a lateral axis represents time. Also, the drawing (d) in the same figure illustrates a change pattern of the set value of the cycle number, in which a vertical axis represents the generated cycle number (number of times) of the basic frequency, and a lateral axis represents time.

In this example, the generation cycle of the frequency of low-frequency wave is 0.5, that is, half a cycle, so as to reverse the polarity every time when the low frequency is generated (that is, alternately).

As illustrated in FIG. 8(d), the period in which the high frequency (basic frequency) is output is elongated little by little by changing so that the cycle number of the basic frequency is increased at a rate of variability of one cycle per second from 0 and, when a preset maximum cycle number is reached, the period in which a high frequency is output can be shortened little by little by decreasing by one cycle per second at this time.

Accordingly, the current waveform is changed as the drawings (a)→(b)→(c)→(b)→(a) in the same figure.

FIGS. 9 (a) to (c) illustrate other examples of the cycle number set value. In all of these drawings, vertical axes represent the generated cycle number (number of times) of the basic frequency, and lateral axes represent time.

The drawing (a) in the same figure illustrates that the period in which the high frequency is output at a constant speed from the minimum cycle number (FcyMin) is increased to reach the maximum cycle number (FcyMax), which is maintained for a predetermined period, and then, the period in which the high frequency is output from the maximum cycle number (FcyMax) is shortened little by little by a constant speed.

The drawing (b) in the same figure illustrates that the period in which the high frequency is output at a constant speed from the minimum cycle number (FcyMin) is increased to reach the maximum cycle number (FcyMax) and, when the maximum cycle number is reached, that state is maintained for a predetermined period, and then, the period in which the high frequency is output from the maximum cycle number (FcyMax) is shortened little by little by a constant speed, and when the minimum cycle number (FcyMin) is reached, that state is maintained for a predetermined period.

The drawing (c) in the same figure illustrates that when the predetermined cycle number is reached in the course of increasing from the minimum cycle number (FcyMin) to the maximum cycle number (FcyMax) in the drawing (b) described above, that state is maintained for a predetermined time, and when a predetermined cycle number is reached in the course of decreasing from the minimum cycle number (FcyMin) to the maximum cycle number (FcyMax), that state is maintained for a predetermined period.

The control of such parameters illustrated in FIG. 9 may be realized practically by obtaining optimum parameters experimentally in accordance with the specifications of the lamp in advance, and storing the obtained parameters in the count set value control units 62 and 72.

Alternatively, it is also possible to create a table in the low-frequency set value control unit 73 to record the low-frequency period set values in accordance with lighting voltages (lamp supply voltages) in the table, refer to the table, and selectively control the low frequency in accordance with the lighting voltage described above.

Table 1 shows an example of a table in which the lamp supply voltages (lighting voltages) and the low-frequency period set values are stored.

In this example, the width of the low frequency to be inserted is set to be increased with an increase of the lamp voltage. Although the lamp supply voltage is segmentalized to select the low frequency set values, further segmentalization is also possible and, alternatively, control in which the lamp supply voltage area is divided into two is also possible.

TABLE 1

| Lamp Supply Voltage [V] | Low-Frequency Period Set Value [ms] |
| --- | --- |
| 130- | 100 ms |
| 100-130 | 60 ms |
| 89-100 | 30 ms |
| 60-89 | 10 ms |
| 0-60 | the same as the high frequency set value |

It is not applied when further segmentalization of the low frequency width is required and, for example, it is also possible to generalize the relationships between the lamp voltage and the low frequency set value by expressions given below in Table 2 and to provide the low-frequency set value control unit 73 with a function to calculate the low frequency set value from the lamp supply voltage by using the expression. In the same manner, although the lamp supply voltage is segmentalized to select the low frequency set values in this example, further segmentalization is also possible, and alternatively, control by using only one expression is also possible.

TABLE 2

| Lamp Supply Voltage [V] | Expression of Low-Frequency Period Set Value Control Unit |
| --- | --- |
| 130- | =Constant K1 × Lamp Supply Voltage + Constant K2 |
| 100-130 | =Constant L1 × Lamp Supply Voltage + Constant L2 |
| 89-100 | =Constant M1 × Lamp Supply Voltage + Constant M2 |
| 60-89 | =Constant N1 × Lamp Supply Voltage + Constant N2 |
| 0-60 | =Constant P1 × Lamp Supply Voltage + Constant P2 |

Alternatively, the set value of the cycle number of the basic frequency may be varied in accordance with the lamp voltage so as to achieve further elongation of the lifetime. As in Table 3, in a case where the lamp voltage is high, the maximum value of the cycle number in which the high frequency is inserted is set to be smaller, so that the low frequency is inserted at a high frequency consequently, so that the load of the distal end of the electrode may be increased and, if the lamp voltage is low, the frequency in which the low frequency is inserted is lowered, and hence the load can be further lowered.

Although the cycle number set value is segmentalized to select the values in this example, further segmentalization is also possible and, alternatively, control by creating expressions is also possible.

TABLE 3

| Lamp Voltage [V] | Maximum Value of Basic Frequency Cycle Number |
| --- | --- |
| 130- | 50 |
| 100-130 | 80 |
| 89-100 | 100 |
| 60-89 | 150 |
| 0-60 | 300 |

Also, although the maximum value of the cycle number of the basic frequency as a parameter which is to be changed in accordance with the lamp voltage has been exemplified in the description, as the parameters to be changed, those which are preferable for elongation of the lifetime may be selected as needed according to the respective characteristic of the lamp, for example, those which cause the minimum value, an average value, and the width of increasing and decreasing (the difference between the maximum value and the minimum value) of the cycle number to be decreased with an increase of the voltage, or those which cause the low-frequency cycle number to be increased with the increase of the voltage.

Also, in the example, measuring the lighting voltage and changing the low frequency in accordance with the change of the lighting voltage have been described. However, since the supply current changes in accordance with the change of the lighting voltage in a case where the lamp is controlled by the constant power, even though the low frequency is changed in accordance with the change of the supply current, it is changed indirectly in accordance with the change of the lighting voltage.

Therefore, in the present invention, the low frequency may be changed indirectly in accordance with the lighting voltage.

Subsequently, a result of comparative experiment conducted for confirming the advantages of the present invention will be described.

This experiment is a comparison of a luminance maintenance ratio among the lighting system A described in Patent Literature 1 described above (the lighting system in which the parameter to be selected for the low frequency is changed in accordance with the change of the lighting voltage of the discharge lamp), the lighting system B (the lighting system in which the period in which the basic frequency is supplied is controlled so as to be increased and decreased little by little at ever predetermined time), and the lighting system of the present invention in which the lighting system B is applied to the lighting system A described above (referred to as the lighting system of the present invention).

FIG. 10 shows the result of experiment. A lateral axis of the same figure represents time (h), a vertical axis represents the luminance maintenance ratio (%), and A denotes the lighting system A, B denotes the lighting system B, and C denotes the lighting system of the present invention.

The specifications of the lamp used in the experiment are as follows.

| Lamp Specifications | |
| --- | --- |
| Rated power | 270 W |
| Rated Voltage | 80 V |
| Capacity of Light-Emitting Portion | 80 mm$^3$ |
| Distance between Electrodes | 1.2 mm |
| Amount of Mercury | 0.28 mg/mm$^3$ |

Also, the lighting conditions of the respective lighting systems are as follows. The respective lamps repeated ON (lighting) for two hours and OFF (extinction) for 15 minutes under the conditions in tables A to C given below and the luminance was measured at every elapse of 250 hours.

(1) Lighting Conditions of Lighting System A

In the lighting system A, the high-frequency period set value, the low-frequency period set value, and the interval of insertion of the low frequency are set as shown in Table A of Table 4 given below for the lamp supply voltage and the lamp was lit.

(2) Lighting Conditions of Lighting System B

In the case of the lighting system B, the high-frequency period set value, the low-frequency period set value, and the interval of insertion of the low frequency, and the cycle increasing and decreasing speed are set as shown in Table B of Table 4 given below and the lamp was lit.

(3) Lighting Conditions of Lighting System C

In the lighting system C, the high-frequency period set value, the low-frequency period set value, and the interval of insertion of the low frequency, and the cycle increasing and decreasing speed are set as shown in Table C of Table 4 given below for the lamp supply voltage and the lamp was lit.

TABLE 4

Table A

| Lamp Supply Voltage [V] | High-Frequency Period Set Value [ms] | Low-Frequency Period Set Value [ms] | Low-Frequency Insertion Interval Set Value [ms] | |
|---|---|---|---|---|
| 130- | 1.4 | 100 | 100 | |
| 100-130 | 1.4 | 60 | 100 | |
| 89-100 | 1.4 | 30 | 100 | |
| 60-89 | 1.4 | 10 | 100 | |
| 0-60 | 1.4 | 1.4 | (100) | |

| Lamp Supply Voltage [V] | High-Frequency Period Set Value [ms] | Low-Frequency Period Set Value [ms] | Low-Frequency Insertion Interval Set Value [ms] | Cycle Increasing and Decreasing Speed |
|---|---|---|---|---|
| Table B | | | | |
|  | 1.4 | 10 | 0-300 | 1 cycle/2 s |
| Table C | | | | |
| 130- | 1.4 | 100 | 0-300 | 1 cycle/2 s |
| 100-130 | 1.4 | 60 | 0-300 | 1 cycle/2 s |
| 89-100 | 1.4 | 30 | 0-300 | 1 cycle/2 s |
| 60-89 | 1.4 | 10 | 0-300 | 1 cycle/2 s |
| 0-60 | 1.4 | 1.4 | (0-300) | 1 cycle/2 s |

The lighting system A controls the width of the low frequency in accordance with the voltage (current) so that an optimal load is applied to the electrode, and unnecessary load is not applied to the electrode, so that the lifetime is elongated to some extent. However, since the driving is performed with a constant drive during the time zone when the voltage does not change, displacement of the projection occurs. When the projection is moved and the lighting voltage is increased, the distance between the electrodes is understood to have increased, and the width of the low frequency is increased. In a state in which the projection is displaced, the luminance is also lowered. In this manner, unnecessary loads are applied to the electrode every time when the projection is displaced.

The lighting system B suppresses the displacement of the projection and suppresses the lowering of the luminance due to the displacement of the projection, so that the stable lighting is enabled. However, the current load applied to the electrode is not controlled even though the voltage is increased or decreased.

In contrast, according to the lighting system (lighting system C) of the present invention in which the lighting system A and the lighting system B are combined described above, the displacement of the projection is suppressed while controlling the temperature of the projection neither to be too cold nor too hot by changing the width of the low frequency by the voltage (current) value, so that an unnecessary load can be avoided.

With the experiment described above, the fact that the lighting system of the present invention achieves a highest luminance maintenance ratio is confirmed as illustrated in FIG. 10.

REFERENCE SIGNS LIST

10 discharge lamp
11 light-emitting portion
12 sealed portion
13 metallic foil
14 external lead
20a, 20b electrode
21 projection
201 spherical portion
202 shaft portion
30 power supply apparatus
51 driver
52 power control unit
60 high-frequency generator
61 first cycle number counter
62 first count value set value control unit
63 high-frequency set value control unit
70 low frequency generator
71 second cycle number counter
72 second count value set value control unit
73 low-frequency set value control unit
80 selector
U1 step-down chopper circuit
U2 full-bridge circuit (full-bridge type inverter circuit)
U3 starter circuit
U4 control unit
Lh, Lx coil
Cx, Cp, Ch capacitor
Qx switching element
Q1, Q2, Q3, Q4 switching element
Vx resistance for detecting a voltage
Rx resistance for detecting a current
Gx. G1-G4 gate signal

What is claimed is:

1. A high pressure discharge lamp lighting apparatus comprising: a high pressure discharge lamp including a pair of electrodes arranged so as to oppose each other in the interior of a discharge container formed of quartz glass and mercury enclosed therein, and a power supply apparatus configured to supply an alternating current to the discharge lamp, wherein:

the power supply apparatus is configured to supply the alternating current having a basic frequency at the time of steady state lighting and a low frequency lower than the basic frequency alternately to the high pressure discharge lamp, the alternating current having the basic frequency is an alternating current having a frequency selected from a range between 60 and 1000 Hz, the alternating current having the low frequency consist of a frequency selected from a range between 5 and 200 Hz lower than the frequency of the alternating current of the basic frequency, and having a length of half a cycle or longer, has an interval from generation of the low-frequency alternating current to generation of a next low-frequency alternating current 120 seconds or shorter, and changes the frequency of a low-frequency wave in response to the change of a lighting voltage of the discharge lamp, and the power supply apparatus supplies the alternating current to the high pressure discharge lamp so as to increase and decrease a period in which the basic frequency is supplied little by little by every predetermined time at least during a period in which the lighting voltage of the discharge lamp continues at the same lighting voltage.

2. The high pressure discharge lamp lighting apparatus according to claim 1, wherein the power supply apparatus changes the frequency of the low-frequency wave to a low frequency when the lighting voltage of the discharge lamp is increased, and to a high frequency when the lighting voltage of the discharge lamp is lowered.

* * * * *